(No Model.)
T. A. EDISON.
SYSTEM OF ELECTRIC LIGHTING.
No. 446,666. Patented Feb. 17, 1891.
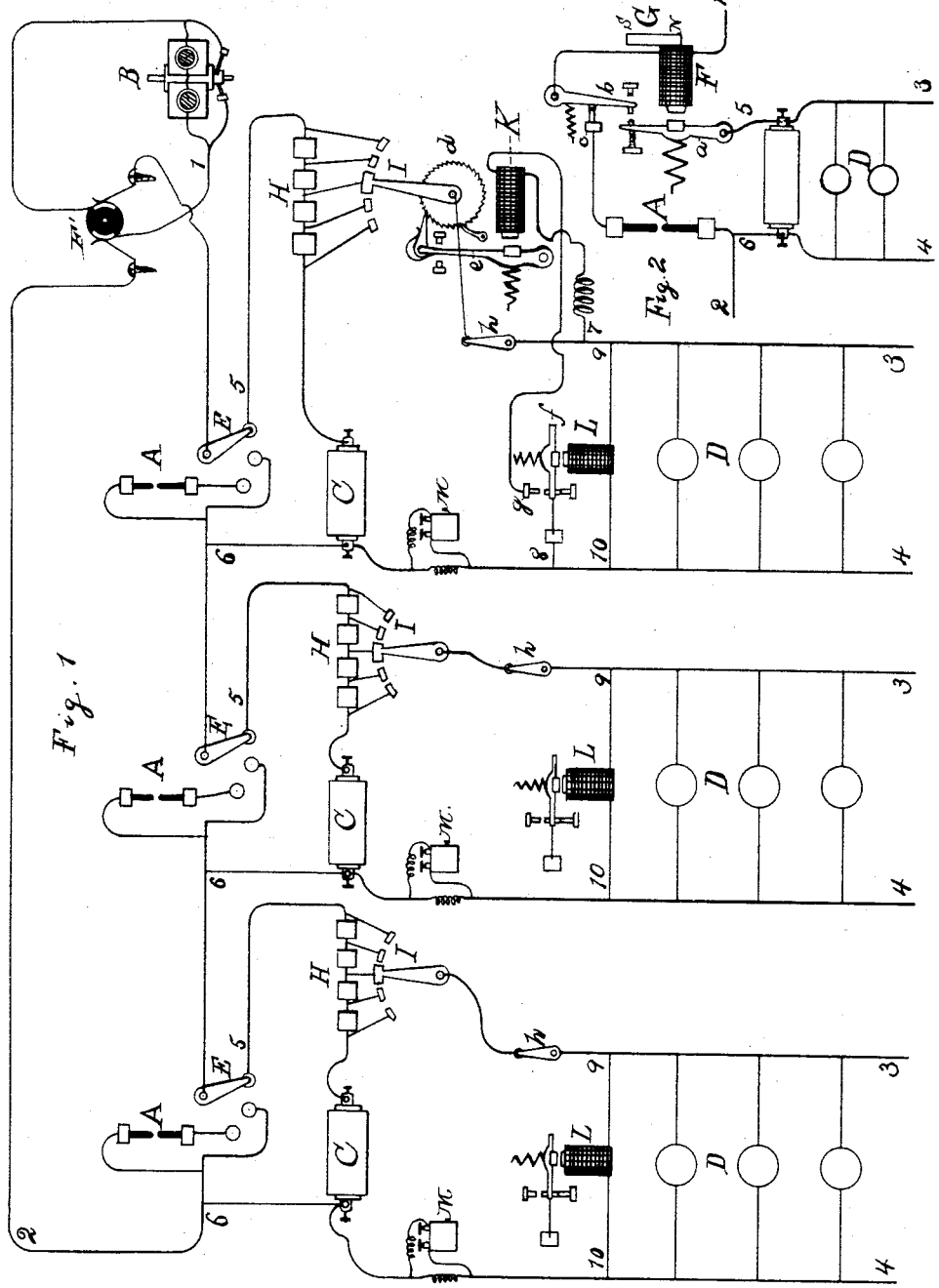
WITNESSES:
INVENTOR:

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

SYSTEM OF ELECTRIC LIGHTING.

SPECIFICATION forming part of Letters Patent No. 446,666, dated February 17, 1891.

Application filed June 26, 1882. Serial No. 65,233. (No model.) Patented in England July 14, 1882, No. 3,355.

*To all whom it may concern:*

Be it known that I, THOMAS A. EDISON, of Menlo Park, in the county of Middlesex and State of New Jersey, have invented a new and useful Improvement in Systems of Electric Lighting, (for which I have obtained Letters Patent in Great Britain, No. 3,355, July 14, 1882;) and I do hereby declare that the following is a full and exact description of the same, reference being had to the accompanying drawings, and to the letters and figures of reference marked thereon.

The object I have in view is to produce simple and efficient means for supplying with current incandescing electric lamps, motors, or other translating devices arranged in multiple arc, and for utilizing a current of high tension in the main conductors, so as to reduce the investment for copper in such main conductors; and my object is more especially to run incandescing lamps from a circuit having a high-tension current containing arc lights. This I accomplish by locating secondary batteries in series in the arc-light circuit and charging such secondary batteries when the arc lights are not in use, as during the day, the main circuit being turned off of the secondary batteries and on the arc lights at night. At that time the secondary batteries will be used to supply the incandescing lamps, and they will be discharged in quantity through such lamps. An automatic switch is preferably used for the purpose of cutting out the secondary batteries and throwing in the arc lights.

It is further my object to provide means for maintaining a constant electro-motive force in the circuits for the incandescing lamps and to provide means for measuring the current consumed by each user of incandescing lamps.

An apparatus embodying the invention is illustrated diagrammatically in the accompanying drawings.

Figure 1 represents the general arrangement of the apparatus, and Fig. 2 the automatic switch preferably employed.

A represents arc lamps arranged in series in a circuit 1 2, supplied with a current of high tension by one or more dynamo or magneto electric machines B.

C represents secondary batteries, each of which supplies incandescing electric lamps D, arranged in separate multiple-arc circuits from conductors 3 4. Each secondary battery is arranged in a circuit 5 6 around one or more of the arc lamps and is thrown into the main circuit, cutting out the arc lamp or lamps by means of a switch E. When the switches are moved to throw in the circuits 5 6, all the secondary batteries will be in series in the main circuit and will be charged therefrom and the arc lamps will be cut out of circuit, while the movement of the switches to their opposite limit will cut the secondary batteries out of the main circuit and throw the current through the arc lamps. The secondary batteries will then discharge through the lamps in their individual consumption-circuits.

The automatic switch shown in Fig. 2 is preferably employed in place of a hand-switch. A polarized switch is well adapted for the purpose, a positive current being used to charge the secondary batteries and a negative current to work the arc lamps, or vice versa. The positive current works the switch to throw the secondary batteries into circuit, while the negative current moves the switch in the opposite direction.

In the main circuit, at each secondary battery, is located an electro-magnet F, which has attached to its core one end of a permanent magnet G, or the core itself is a permanent magnet. The armature-lever $a$ of this electro-magnet is retracted by a spring, and in its forward movement strikes a lever $b$ and separates it from a contact $c$, opening the arc-light circuit and completing the charging-circuit through the secondary battery, the lever $b$ and contact $c$ being in the main line and the armature-lever $a$ in the circuit 5 6. A positive current tends to polarize the core of the electro-magnet F the same as the permanent magnet, and both forces acting together the armature-lever will be attracted. A negative current opposes the action of G and neutralizes the effect of the permanent magnet, permitting the spring to retract the armature-lever $a$, separating it from $b$ and allowing $b$ to rest on $c$. By means of this automatic switch the secondary batteries can be charged, and then by simply reversing the connections of the main conductors at the generator or generators the arc lights will be thrown into circuit.

Instead of reversing the connections at the generator or generators, a suitable reversing-switch F' may be used for the purpose.

To maintain a constant electro-motive force in each lamp-circuit, extra secondary cells are preferably used, which are charged at the same time as the main secondary battery, and these cells are automatically thrown into circuit, as required, to maintain a constant electro-motive force, the mechanism for this purpose being controlled or operated by an electro-magnet arranged in multiple arc and affected the same as the lamps.

Instead of throwing charged secondary cells into the circuit, counter electro-motive force or resistance already in the circuit may be cut out. Such resistance may be of carbon or wire or may be a liquid resistance, and the counter electro-motive force, if employed, may be in the form of uncharged secondary cells, which will be charged from the main secondary battery and will be cut out automatically as the electro-motive force drops. The form shown in the drawings is one employing a number of secondary cells H in each circuit 5 6. These are charged with the secondary battery C in the same circuit 5 6, and are thrown into the lamp-circuit by a contact-arm I in the circuit 3 4. This arm is carried by a ratchet-wheel $d$, with which engages a pawl on an armature-lever $e$. The electro-magnet K, which attracts this armature-lever, is in a multiple-arc circuit 7 8 from 3 4. It passes through the armature-lever $f$ and back contact $g$ of an electro-magnet L, which electro-magnet is in a multiple-arc circuit 9 10 from 3 4, and is affected exactly as are the lamps. After the secondary battery is charged the arm I is moved onto the first contact to the left, cutting all the extra cells H out of the lamp-circuit. The magnet L will then have sufficient strength to hold $f$ on its front contact. When the electro-motive force drops a definite extent, L will weaken and allow $f$ to make its back contact $g$, closing circuit 7 8, energizing K, and moving the pawl-lever $e$, so as to throw arm I onto the second contact, throwing in one cell. This movement reoccurs until all the extra cells are thrown in. The contact-arm I, as will be understood, should make one contact-plate before it leaves the other.

The devices for maintaining a constant electro-motive force are shown complete in connection with one lamp-circuit only, it being understood that they are used with each lamp-circuit.

M is a suitable electric meter, which is introduced into each lamp-circuit 3 4 to measure the consumption of electricity. My electrolytic meter is preferred for this purpose.

Each lamp-circuit 3 4 is provided with a switch $h$, by which it can be broken to prevent the current from passing through the incandescing lamps in charging the secondary batteries. It will be understood that each lamp is provided with its individual circuit-controller.

What I claim is—

1. The combination, with a circuit and arc lamps arranged for connection in series therein, of secondary batteries charged from such circuit, and incandescing electric lamps worked from the secondary batteries, switches for cutting in the secondary batteries and cutting out the arc lamps, or vice versa, and electro-magnets connected with the main circuit for controlling the said switches, and means for controlling said magnets, substantially as set forth.

2. The combination, with a circuit and arc lamps arranged for connection in series therein, of secondary batteries charged from such circuit, and polarized electric magnetic switches for completing the circuit through the arc lamps or secondary batteries, as desired, substantially as set forth.

3. The combination, with a circuit and arc lamps arranged for connection in series therein, of secondary batteries charged from such circuit, polarized electric magnetic switches in the line for completing the circuit through the arc lamps or secondary batteries, incandescing electric lamps worked from the secondary batteries, and means for making and breaking the incandescing-lamp circuits, substantially as set forth.

4. The combination, with a circuit and arc lamps arranged for connection in series therein, of secondary batteries charged from such circuit, and a polarized switch for completing the circuit through the arc lamps or secondary batteries, according to the direction of the current, substantially as set forth.

5. In a system of electric lighting, the combination, with an electrical generator, of incandescing electric lamps, an intermediate secondary battery charged from the generator and discharged through the lamps, and means for maintaining a practically constant electro-motive force in the discharging-circuit of the secondary battery, substantially as set forth.

6. In a system of electric lighting, the combination, with an electrical generator, of incandescing electric lamps arranged in multiple arc, an intermediate secondary battery charged from the generator and discharging through the lamps, means for maintaining a practically constant electro-motive force in the discharging-circuit of the secondary battery, and an electro-magnet in a multiple-arc circuit controlling or operating said means, substantially as set forth.

7. In a system of electric lighting, the combination, with a circuit having a current of high tension, of secondary batteries charged in series in said circuit and discharging separately through the lamps, extra secondary cells in the circuit of each secondary battery, and means for throwing such extra cells into circuit to maintain a practically constant electro-motive force, substantially as set forth.

8. The improved system of distributing electricity, involving the combination of the following elements, viz: a main circuit having translating devices, secondary batteries through which the current of the main circuit is thrown when the translating devices of the main circuit are cut out of circuit, consumption-circuits supplied from the secondary batteries when such secondary batteries are disconnected from the main circuit, a switch-magnet directly in the main line for connecting and disconnecting the secondary batteries with and from the main and consumption circuits, and means for making and breaking the circuits of all the translating devices, whereby the current in the main circuit and that stored up in the secondary batteries can be used simultaneously to work lamps or other translating devices, substantially as set forth.

9. The improved system of distributing electricity, involving the combination of the following elements, viz: a main circuit having translating devices arranged in series, and requiring a current of high tension, separate consumption-circuits having translating devices arranged in multiple arc and requiring a current of lower tension, secondary batteries charged in series from the main circuit and discharging through the separate consumption-circuits, means for connecting the secondary batteries in series in the main circuit and disconnecting them therefrom and simultaneously breaking and making the circuits of the translating devices in such main circuit, and means for making and breaking the connection between the secondary batteries and their individual consumption-circuits, the translating devices in the main and separate circuits being worked simultaneously, substantially as set forth.

This specification signed and witnessed this 19th day of June, 1882.

THOMAS A. EDISON.

Witnesses:
RICHD. N. DYER,
EDWARD H. PYATT.